Dec. 2, 1941. J. G. WEBB 2,264,651
MACHINE TOOL
Filed Jan. 5, 1940 5 Sheets-Sheet 1
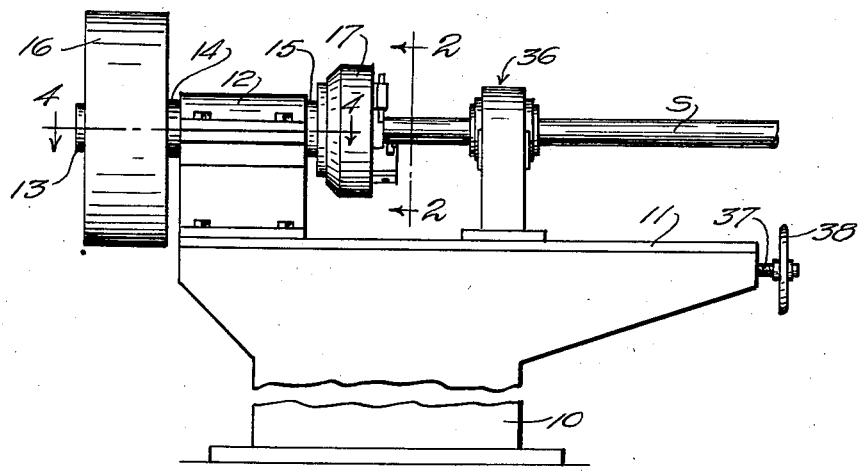
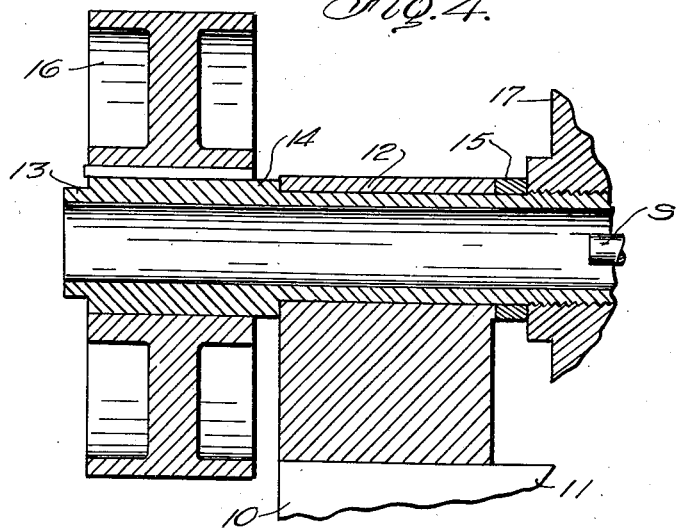
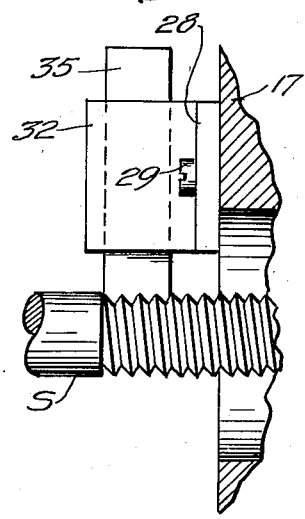
Inventor
J. G. WEBB,
By Horace C. Chandler
Attorney Dec. 2, 1941.   J. G. WEBB   2,264,651
MACHINE TOOL
Filed Jan. 5, 1940   5 Sheets-Sheet 2

Inventor
J. G. WEBB,
By Nomer C. Chandler
Attorney

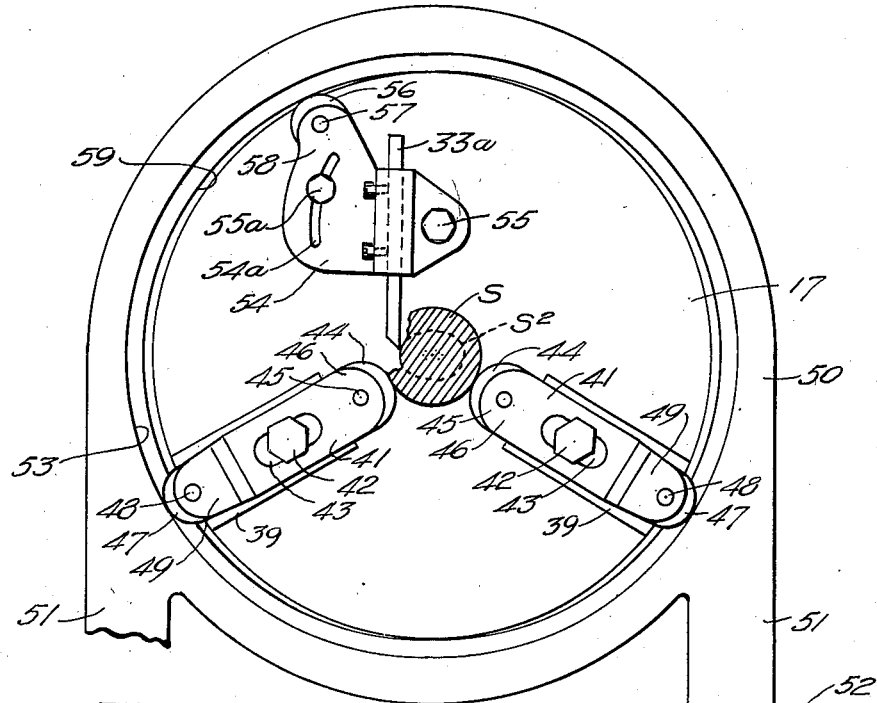
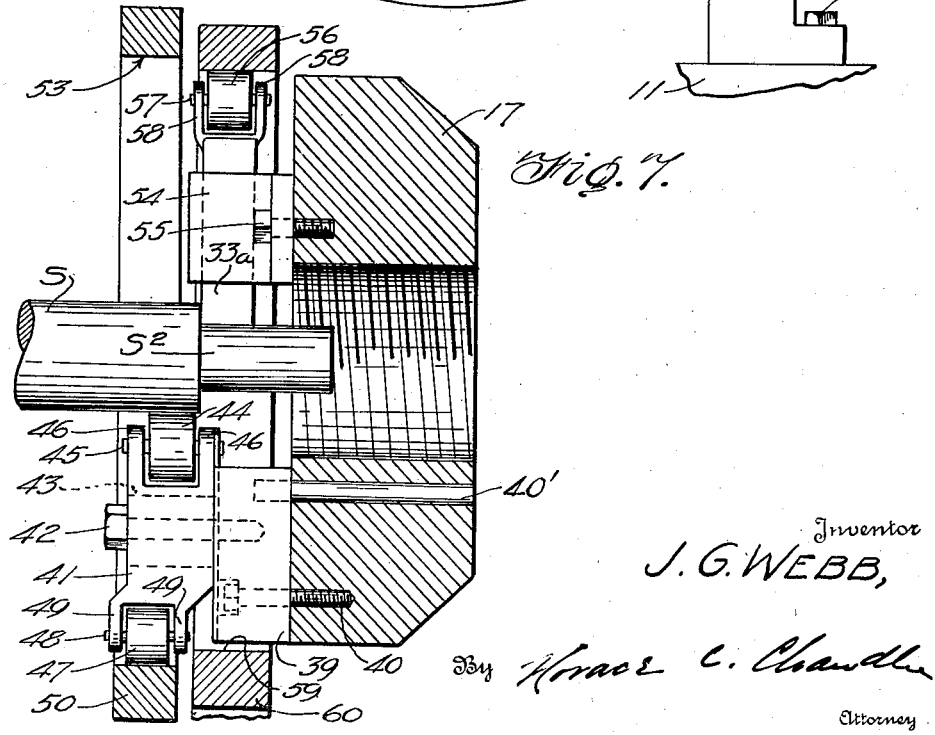

Dec. 2, 1941. J. G. WEBB 2,264,651
MACHINE TOOL
Filed Jan. 5, 1940 5 Sheets-Sheet 4

Inventor
J. G. WEBB,
By Vance C. Chandler
Attorney

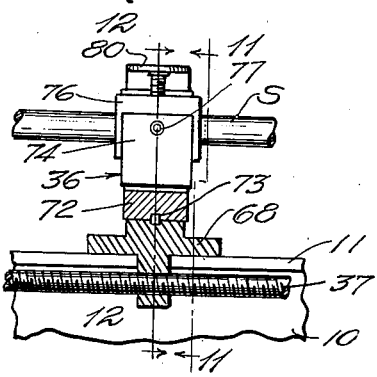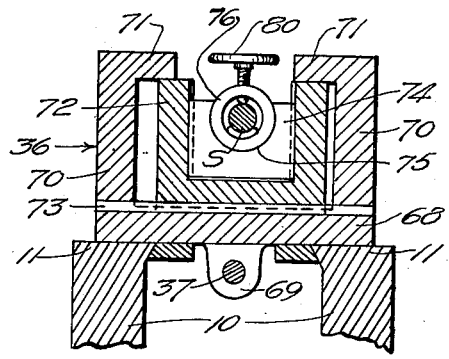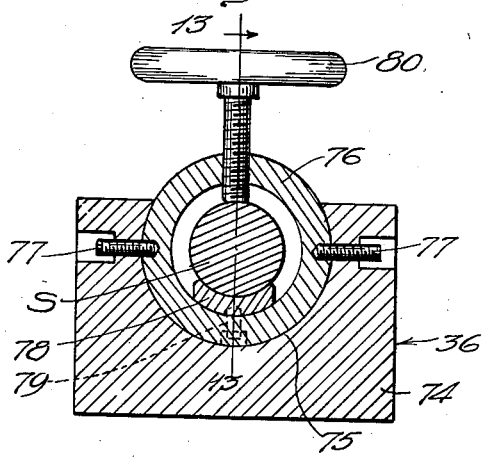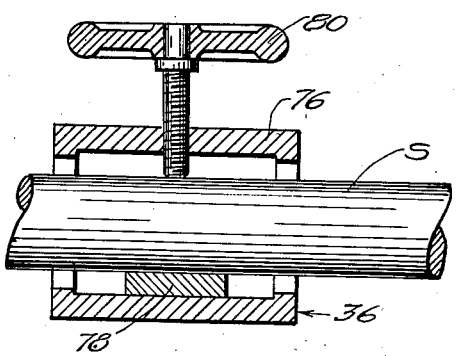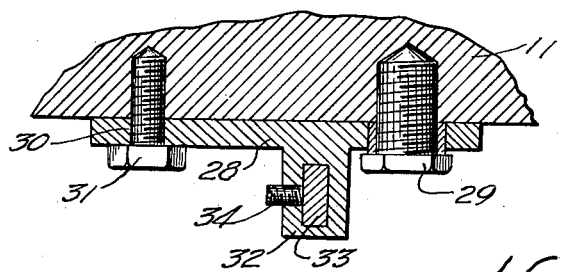

Patented Dec. 2, 1941

2,264,651

UNITED STATES PATENT OFFICE 2,264,651

MACHINE TOOL

John G. Webb, Richmond, Va.

Application January 5, 1940, Serial No. 312,617

9 Claims. (Cl. 82—20)

This invention relates to machine tools and has special reference to a machine tool of the lathe type.

More particularly, the invention relates to a machine for reducing bar stock of metal or other machinable material from a larger to a smaller section, the reduced section being either circular or non-circular in cross section, as may be desired.

One important object of the invention is to provide an improved machine of the kind described so constructed and arranged as to quickly perform the required work in a more efficient and accurate manner than has heretofore been known.

Another important object of the invention is to provide a novel construction of machine of the class which is simple in form and economical to manufacture.

A third important object of the invention is to provide a machine for the purpose set forth wherein the use of the machine, even by an unskilled operative, tends to provide for rapid production of the work.

A fourth important object of the invention is to provide a novel turning head for a machine of this character.

A fifth important object of the invention is to provide a novel arrangement of machine of this class whereby non-circular cross sections may be turned from a solid bar.

A sixth important object of the invention is to provide a novel cut-off arrangement in such a machine.

A seventh important object of the invention is to provide a novel form of vise for securely holding against rotation the stock upon which work is performed.

With the above and other objects in view, as will be presently apparent, the invention consists in general of certain novel details of construction and combinations of parts hereinafter fully described, illustrated in the accompanying drawings, and particularly pointed out in the appended claims.

Figure 2:
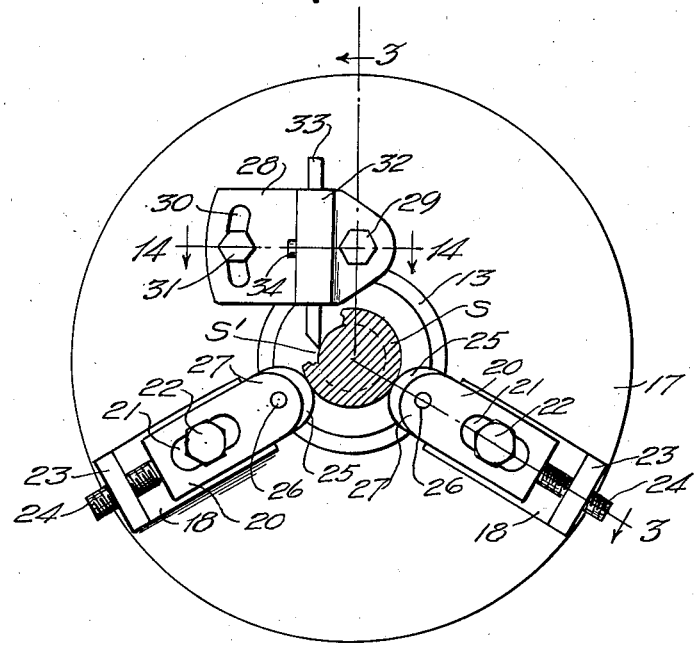
Figure 3:
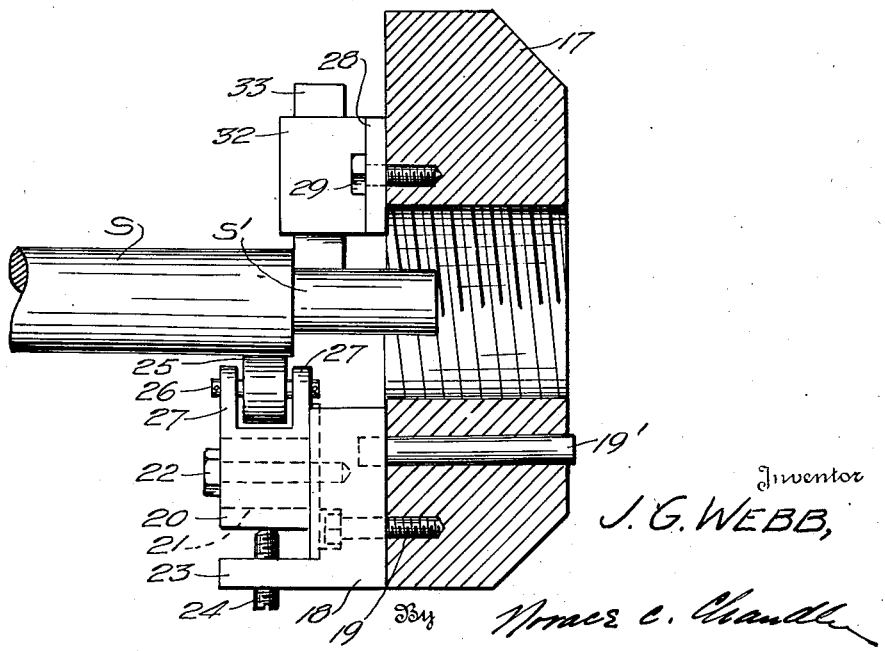
Figure 8:
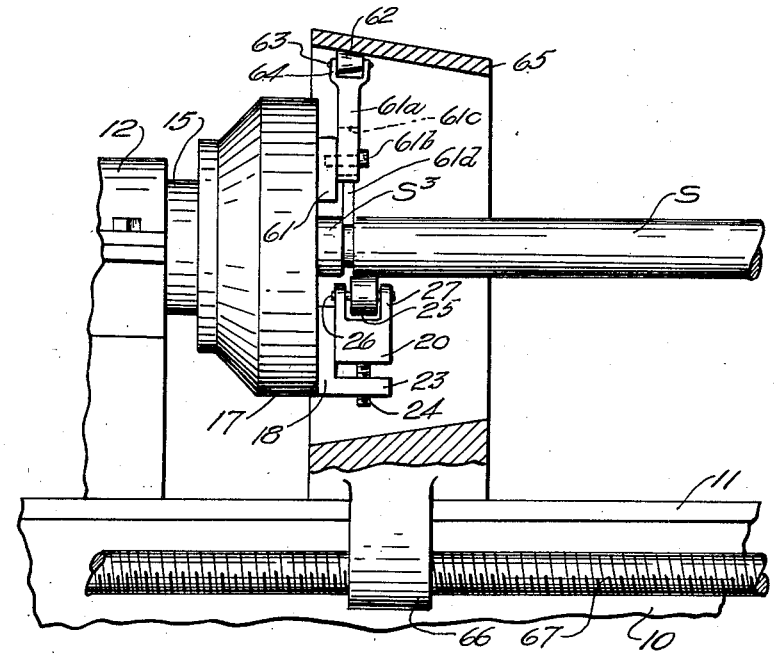
Figure 9:
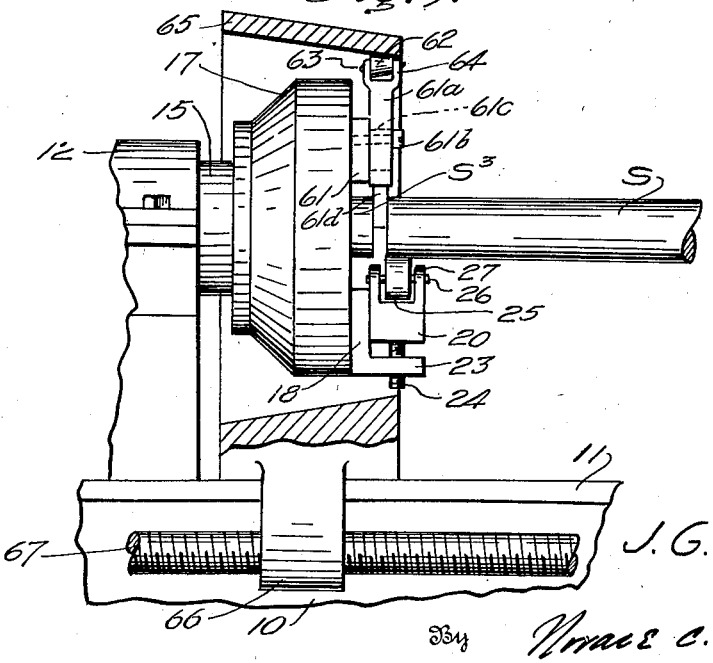

In the accompanying drawings, like characters of reference indicate like parts in the several views, and Fig. 1 is a side elevation of a typical machine constructed in accordance with the invention, certain of the attachments being omitted, Fig. 2 is an enlarged detail section on the line 2—2 of Fig. 1, Fig. 3 is a side view of the turning head partly in section on the line 3—3 of Fig. 2, and partly in elevation, Fig. 4 is an enlarged fragmentary section on the line 4—4 of Fig. 1, Fig. 5 is a fragmentary detail showing the device arranged for cutting threads on a bolt, Fig. 6 is a view similar to Fig. 2, but showing a modified head arrangement as used in connection with certain cam attachments for cutting non-circular forms, Fig. 7 is a view similar to Fig. 3, but showing the arrangement of Fig. 6, Fig. 8 is a fragmentary side elevation partly in section showing the device arranged for cutting bar stock into pieces of the desired length and the attachment used therein with the parts in one position, Fig. 9 is a view similar to Fig. 8 but showing the parts in a second position, Fig. 10 is a side elevation, partly in section, of the vise used for holding the stock, Fig. 11 is a section on the line 11—11 of Fig. 10, Fig. 12 is an enlarged fragmentary section on the line 12—12 of Fig. 10, Fig. 13 is a detail section on the line 13—13 of Fig. 12, and Fig. 14 is an enlarged detail section on the line 14—14 of Fig. 2.

The invention as here shown includes a base 10 of conventional form and having its upper part shaped to constitute a pair of ways 11. At one end of the ways 11 is fixed a head bearing 12 wherein is journalled a hollow shaft or spindle 13 held against longitudinal movement in one direction by an enlarged portion 14 and in the other direction by a collar 15. A pulley 16 is shown as forming the driving means for the spindle 13. The parts just described are illustrated in a purely conventional manner and are intended to indicate the ordinary head arrangement of the usual lathe.

The forward end of the spindle 13 is externally threaded and on the threaded end is screwed a face plate or tool-carrying head 17. On the forward face of the head 17 are mounted radially disposed brackets which, in the form shown in Figs. 2 and 3, are indicated at 18. The brackets 18 are secured to the head 17 by screws 19, a pin 19' being used to position each bracket.

Gibbed to each of the brackets 18 is a slide 20 having an elongated slot 21 therein and a screw 22 passes through the said slot and engages in the brackets 18 to permit movement of the slide 20 longitudinally of the bracket. At the outer end of each bracket 18 is a lug 23 wherethrough passes a screw 24 which bears against the outer end of the slide 20, thus limiting outward movement of the slide and also serving to form adjusting means for the slide so that the latter can be accurately positioned with relation to the center of the head 17. The inner end of each slide is forked to support a bearing roller 25 which is mounted on a shaft 26 carried by the arms 27 of the fork.

A tool support 28 is pivoted to the forward face of the head 17 by a screw 29. Adjacent its other end, the tool support or carrier 28 is provided with an arcuate slot 30 concentric to the screw 29 and through this slot extends a clamping screw 31 which engages in the head 17. The carrier 28 is provided with a hollow lug 32 wherein is fitted a tool 33, set screws 34 being used to secure the tool in position.

The stock on which the device operates, and which is held against rotation by means of a vise slidably mounted on the ways 11, the construction of which vise will be described later herein, passes into the hollow spindle from the tail end of the machine and the unturned body of the round bar forming the stock is indicated at S, the turned portion being indicated at S'. From Figure 3 it will be seen that the rollers 25 engage the part S of the stock, while the tool 33 engages the stock close to its engagement by the rollers 25. Thus, the rollers afford strong support to the stock and permit heavy cuts to be made without chattering or other undesirable effects. The position of the tool 33 may be regulated by loosening the screw 31 and swinging the carrier on the pivot screw 29.

As shown in Fig. 5, a thread-cutting tool 35 may be substituted for the tool 33.

For supporting the stock and holding the same against rotation, a vise 36 is mounted on the ways 11 and is arranged to be fed along the ways in any suitable manner, as by a carrier screw 37 and handwheel 38, these parts 37 and 38 indicating any conventional means for moving the vise towards the head 17.

In order to produce a non-circular cut of the stock, the arrangement shown in Figures 6 and 7 may be used. In this arrangement, the head 17 is fitted with radially disposed brackets 39 held to the head by screws 40 and positioned by pins 40'. On the brackets are gibbed slides 41 which are held for longitudinal movement on the bracket by screws 42 passing through longitudinal slots 43 formed in said slides. The inner ends of the slides 41 are forked and in their forked ends are carried bearing rollers 44 mounted on shafts 45 which are supported in the arms 46 of the forks. The outer ends of the slides 41 are offset, as shown, and are forked to support rollers 47 mounted on shafts 48 in the arms 39 of the outer forks. In connection with this arrangement, a camming member 50 of generally circular form and provided with legs 51 is supported on the ways 11 and secured thereto as indicated at 52. This member 50 has an internal cam face 53 against which the rollers 47 and slides 41 are forced inwardly or allowed to move outwardly, thus producing a predetermined radial movement of the stock S.

Also the tool carrier 54 has one end pivoted to the head screw 55 and its other end is forked to support a roller 56 mounted on a shaft 57 having its ends supported in the arms 58 of the fork. The roller 56 works on the cam surface 59 of a camming member 60. By this means, the tool 33a is rocked inwardly at desired intervals and then allowed to move outwardly, the outward movement being effected by the resistance to cutting the stock. The cut stock S² in this case may take any desired cross-section, the shape depending on the cam contours.

For purposes which will presently be plain, it is desirable at times to prevent rocking of the tool carrier 54 on the screw 55 and to that end a slot 54a is formed in the tool carrier concentric to the screw 55 and through this slot passes a clamping screw 55a which enters the head 17. When the screw 55a is tightened it clamps the member 54 against rocking on the screw 55 but when the screw 55 is loosened it permits rocking movement of the tool holder 54 and consequently of the tool 33a.

From the foregoing description of the construction illustrated in Figures 6 and 7, it will be understood that during the operation of this form of the invention, the roller 44 will force the stock in the direction of the tool 33a, while the roller 56 is causing the tool carrier 54 to oscillate, so as to force the tool towards the stock. It is to be understood, however, that when producing a non-circular cut, the camming member 50 may be omitted and the slides 41 held against movement with respect to the brackets 39 by tightening the screws 42 so that the tool 33a only will be caused to move towards and away from the stock. As an alternative, the camming member 60 may be omitted and the tool carrier 54 held against movement by tightening the screw 55a so that the rollers 44 will then cause the stock to be forced towards the tool 33a by the action of the rollers 47 against the camming member 50. When the camming member 50 is in use, the rollers 44 are tending to flex the stock. The vise which holds the stock against rotation is so constructed as to compensate for this, as will be set forth later.

The cut-off arrangement is shown in Figures 8 and 9 wherein the same type of rollers 25 and their mountings are used as in Figures 2 and 3. However, the tool holder of Figs. 2 and 3 is replaced by a bracket 61 on which is gibbed a slide 61a held in place by a screw 61b passing through a slot 61c formed in the slide. The inner end of the slide 61a carries a cutting-off tool 61d. The outer end of the slide 61a is forked to receive a frusto-conical roller 62 mounted on a shaft 63 supported in the arms 64 of the fork. A member 65 of hollow frusto-conical form is slidably mounted on the ways 11 and is moved therealong by any conventional means such as the nut 66 and screw 67. The roller 62 works on the inside of the member 65 and, as the member 65 moves from the position shown in Fig. 8 to that shown in Fig. 9, the tool 33a moves inwardly until a section of suitable length is cut from the stock S. The portions cut off are forced through the hollow spindle 13 by the longitudinal movement of the stock S carried by the vise 36.

A vise adapted for use in this invention is shown in detail in Figures 10 to 13. It will be seen that this vise includes a base 68 carrying a nut 69 wherethrough the screw 37 passes. Arms 70 extend up from the front and rear sides of the base and have inwardly extending fingers 71 at their upper ends. A transversely slidable U-shaped block 72 is fitted between the fingers and base to slide between the arms 70, a key 73 being employed to prevent the block from slipping from between the arms 70. Between the arms of the block 72 is a vertically slidable block 74 gibbed to the inner faces of the arms of the block 72. The block 74 has a segmento-circular groove 75 in its upper face and in this groove fits a tubular member 76 for the reception of the stock S. The member 76 is held in the block by screws 77. The tubular member 76 is preferably made with an internal diameter sufficiently large to accommodate the largest size of stock used and, in order to center the stock in the member, a shim 78 may be secured in the bottom of the member 76 by a screw 79. A hand screw 80 extends through the upper part of the member 76 and engages the stock S so as to hold it securely from rotation.

This vise permits the stock S to move freely within limits both transversely of the ways and vertically with respect thereto, so that deviation of the stock from axial alinement with the head is accommodated by lateral and vertical movement of its tail end. For instance, the vise permits radial movement of the stock when non-circular cross-sections are being turned with the use of the camming member 50 in the manner already described.

A specific example of the use of this apparatus, as in the manufacture of staybolts for boilers, is described as follows: The parts are first arranged as in Figures 8 and 9. Then a long bar S of round stock of the proper diameter is gripped in the vise 36. The camming member 65, at the start of the work, is drawn to the right sufficiently far to allow the cutting-off tool 61d to clear the bar S as it is fed forward (to the left) by movement of the vise until the desired overall length of the bolt has passed the tool 61d. The feed of the vise is now stopped and the camming member 65 moved to the left, the head 17 being in rotation. Thus, a length of stock, as at S³, is cut off. The operations of moving the cam 65 to the right, feeding the bar forward, and moving the cam to the left are repeated until the entire bar has been cut into staybolt lengths or blanks.

Next, the parts are arranged as in Figures 2 and 3 if the blanks are to have circularly reduced ends, or as in Figures 6 and 7 if the blanks are to have non-circularly reduced ends. The blanks are successively gripped in the vise, fed forwardly against the reducing tool, withdrawn, and removed from the vise.

The blanks now have their reduced ends formed by a suitable forging process such as cold forging to form a head on each blank, by means of which head the staybolt, after it has been completed, may be screwed into place. If the reduced ends of the staybolt sections or blanks have been produced by the mechanism shown in Figures 6 and 7, so that they are non-circular, they will be screwed into position by means of a wrench conforming to their shape so that no forging process will be necessary.

Finally the apparatus is arranged as in Figure 5 and the formed heads of the blanks are successively gripped in the vise and the bodies of the blanks moved past the threading tool 35 to perform the threading operation.

It will be understood that one or more cutting tools, with their supports, may be used, also any suitable number of rollers for supporting the stock. It will also be understood that while the invention has been described herein as used in the manufacture of staybolts, it may be used for any other purpose to which it is suited.

While a specific form of the invention has been described herein, it is obvious that the device may be modified or changed in design without departing from the scope of the invention as set forth in the appended claims.

What is claimed is:

1. In a machine of the lathe type, a head having a centrally disposed opening, means to rotate said head, work-supporting rollers carried by said head, an adjustable tool carrier pivotally mounted on said head for swinging movement toward and from the center of the head, said carrier having an arcuate slot concentric to its pivotal center, and a clamping screw passing through said slot and screwed into said head.

2. In a machine of the lathe type, a head having a centrally disposed opening, means to rotate said head, a tool carrier mounted on said head, radial brackets secured on said head, slides adjustably mounted on said brackets for longitudinal movement thereon, work-supporting rollers carried by the inner ends of said slides, means carried by the brackets for adjusting the slides on the brackets, and other means for securing the slides in adjusted positions.

3. In a machine of the lathe type, a revolvable head having a centrally disposed opening, a tool carrier pivoted on said head, an annular cam member surrounding the path of the tool carrier and having an internal cam surface, means for holding the cam members against rotation, and means supported by the carrier for engaging said cam surface and thereby swinging the carrier.

4. In a machine of the lathe type, a revolvable head having a centrally disposed opening, a tool carrier pivoted on said head, an annular cam member surrounding the path of the tool carrier and having an internal cam surface, means for holding the cam members against rotation, a tool supported in said carrier, and a roller carried by the tool carrier and engaging said cam surface whereby to swing the tool carrier on its pivot.

5. In a machine of the lathe type, a revolvable head having a centrally disposed opening, a tool carrier mounted on said head for movement towards said opening, an annular member surrounding the path of the tool carrier and having a frusto conical internal surface, a tool supported in said carrier, a roller carried by the outer end of said tool carrier and engaging said frusto conical surface, and means for moving the cam member axially of the head.

6. In a machine of the lathe type, a head having a centrally disposed opening, means to rotate said head, a tool carrier pivotally mounted on said head, radial brackets secured on said head, slides adjustably mounted on said brackets for longitudinal movement thereon, work-supporting rollers carried by the inner ends of said slides, rollers on the outer ends of said slides, and a fixed annular cam member having an internal cam surface engaged by the last named rollers.

7. In combination, a tool of the lathe type having a bed, a hollow head mounted on said bed and carrying a turning tool, means to rotate said head, and a vise mounted on said bed to hold stock against rotation and including non-rotatable stock-gripping means and a mounting therefor constructed and arranged for free lateral and vertical movement.

8. A vise for the purpose described including a base member having front and rear vertical arms provided with inwardly projecting fingers at their upper ends, a U-shaped block mounted on said base member and slidable between said arms, a second block mounted for vertical sliding movement in the first block, and a non-rotatable work-gripping device carried by the second block.

9. In a machine of the lathe type, a revolvable head having an axially disposed opening, a tool carrier having an end pivoted to said head, an annular cam member surrounding the path of the tool carrier and having an internal cam surface, a tool supported in said carrier, a roller carried by the outer end of said tool carrier and engaging said cam surface, slides adjustably mounted on said head for radial movement thereon, rollers on the outer ends of said slides, a second cam member having an internal cam surface engaged by the last named rollers, work-supporting rollers carried by the inner ends of said slides, and means for holding the cam members against rotation.

JOHN G. WEBB.